June 2, 1942.　　　　R. B. PURKISS　　　　2,284,921
CASKET SEALING AND LOCKING MEANS
Filed Aug. 7, 1940　　　　4 Sheets-Sheet 1
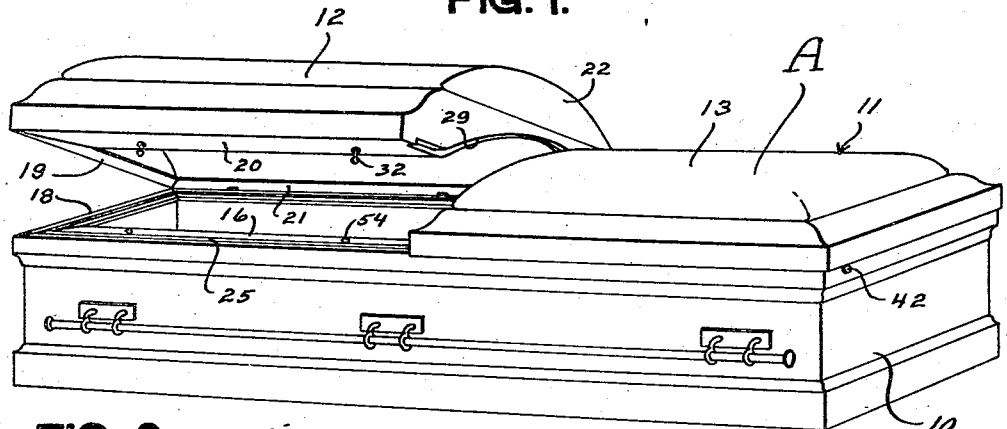
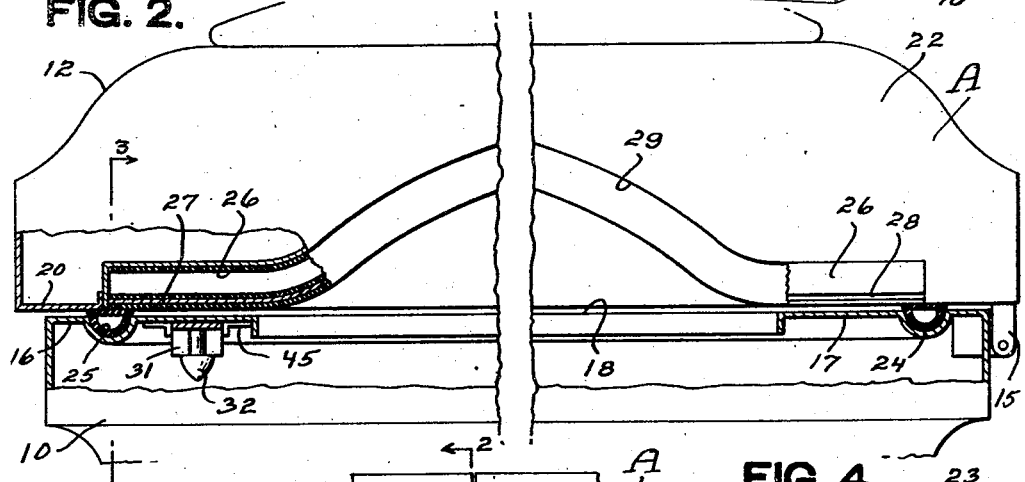
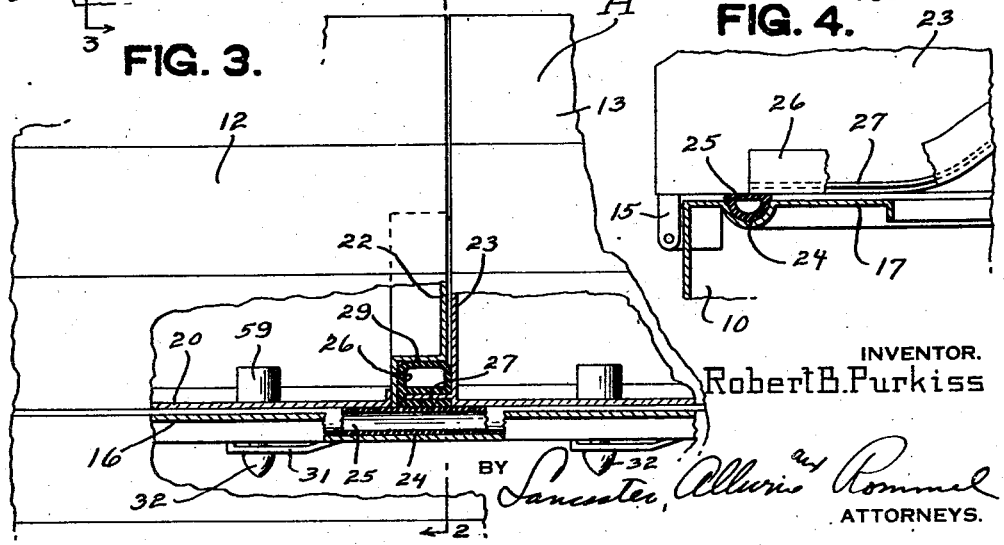
INVENTOR.
Robert B. Purkiss
ATTORNEYS.

June 2, 1942.  R. B. PURKISS  2,284,921
CASKET SEALING AND LOCKING MEANS
Filed Aug. 7, 1940  4 Sheets-Sheet 2

INVENTOR.
Robert B. Purkiss
BY Lancaster, Allwine Rommel
ATTORNEYS.

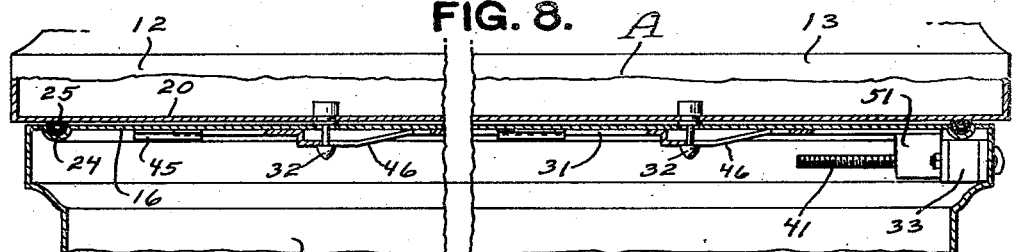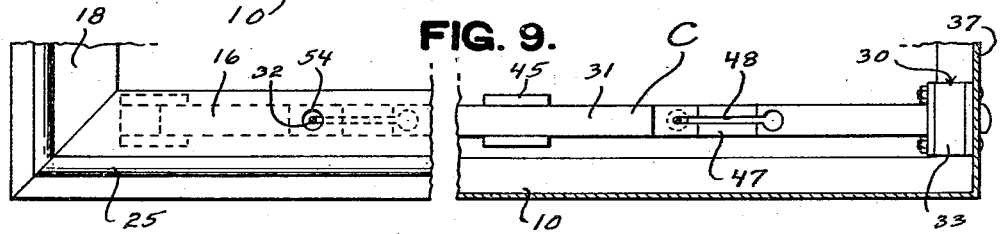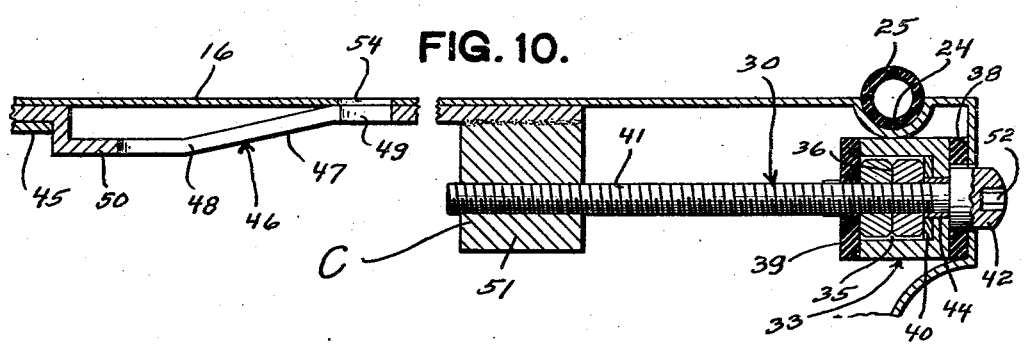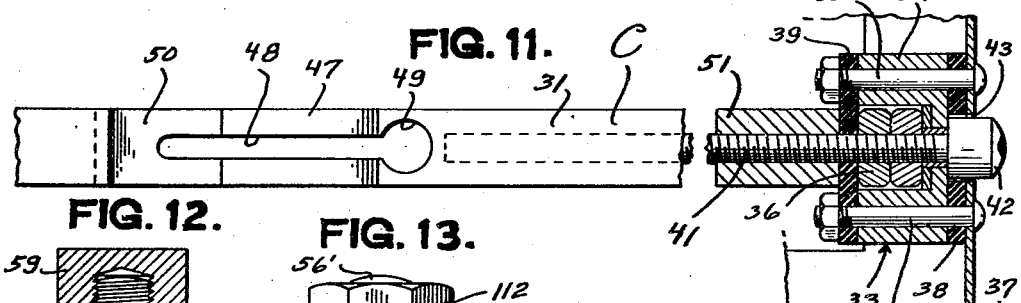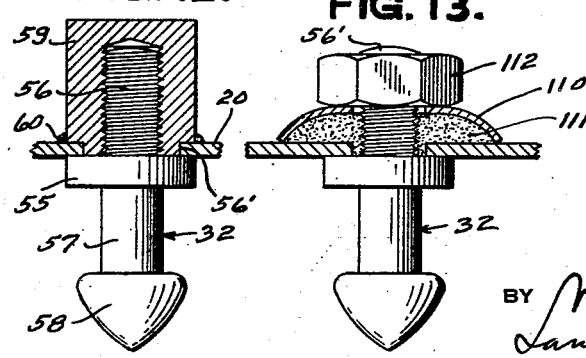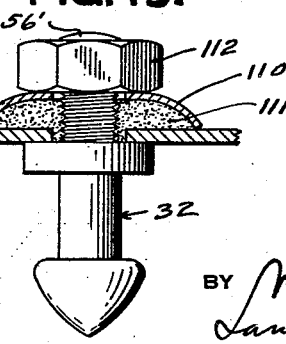

June 2, 1942.  R. B. PURKISS  2,284,921
CASKET SEALING AND LOCKING MEANS
Filed Aug. 7, 1940  4 Sheets—Sheet 4

INVENTOR.
Robert B. Purkiss
BY Sancester, Allwine and Rommel
ATTORNEYS.

Patented June 2, 1942

2,284,921

UNITED STATES PATENT OFFICE 2,284,921

CASKET SEALING AND LOCKING MEANS

Robert B. Purkiss, Batesville, Ind., assignor to The Batesville Casket Company, Batesville, Ind., a corporation of Indiana Application August 7, 1940, Serial No. 351,692

4 Claims. (Cl. 27—17)

This invention relates to improvements in hermetically sealed burial cases or caskets. More particularly, the invention resides in the provision of an improved sealing arrangement for caskets of the type employing separately movable top sections as well as improvements in the structure incorporating the sealing and seal operating mechanism.

It has been an object of the present inventor to provide an improved casket construction wherein the casket is hermetically sealed by means of a marginal sealing gasket extending entirely around the margin of the body of the casket and wherein the lid is sealed with respect to the body of the casket through this gasket, by pull-down means located entirely within the zone of the body sealed by the marginal gasket, which means is actuated from a single point accessible from the exterior of the casket, and which means need only be sealed at a single point; namely, at the point in the wall of the casket through which the means extends.

Another object relates to a pull-down means incorporating a sealing structure for sealing the means at the point where it extends out of the casket body.

One type of casket employs what is known as a cut top or a top which is composed of sections independently movable. Quite obviously, the sealing of this type of casket requires a highly efficient sealing arrangement between the sections as well as between the sections and the body of the casket.

Accordingly, it has been a further object of the present inventor to provide a burial casket of the type including independently movable top sections, in which these top sections are hermetically sealed with respect to the body of the casket and between the sections themselves, employing for this purpose a sealing means between the sections cooperating with the sealing means between the sections and the body in such manner that the casket is completely sealed.

The structure of the pull-down and locking means for pulling the lid into hermetically sealed position on the body is described and claimed in my copending application, Serial No. 415,734, filed October 20, 1941, entitled "Apparatus for locking and sealing a burial casket," which application is divisional of the present application.

Other objects and certain advantages of the present invention will be more fully apparent from the description of the drawings in which:

Figure 1 is a perspective view of a burial case or casket of the single sealed cut top type provided with the improved sealing means and showing the head portion of the top partially opened.

Figure 2 is an enlarged transverse view part in section and part in elevation, taken substantially on the line 2—2 of Figure 3.

Figure 3 is a fragmentary view part in section and part in elevation, taken substantially on the line 3—3 of Figure 2.

Figure 4 is a fragmentary transverse sectional view thru the casket and looking toward the foot portion of the casket top.

Figure 8 is a longitudinal sectional view thru the operating and pull-down means and showing the top in sealed position.

Figure 9 is a top plan of the showing in Figure 8, with a portion of the body flange broken away at the operating end of the wedge bar.

Figure 10 is an enlarged fragmentary longitudinal section thru the operating head and adjacent end of the wedge bar, shown in open or released position.

Figure 11 is a section at a right angle to the showing in Figure 10, with the wedge bar in locking position.

Figure 12 is an enlarged detail view of one of the pull-down studs.

Figure 13 is a detail view of a modified form of pull-down stud.

Figure 5:
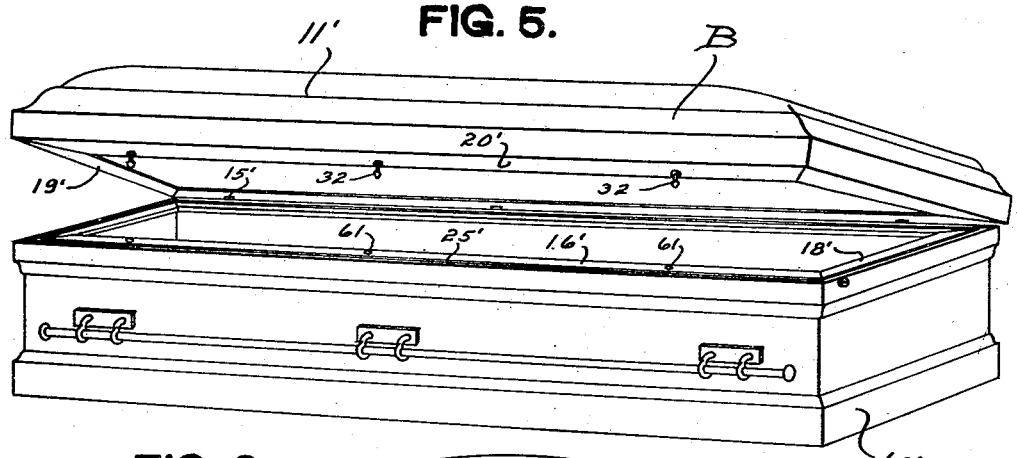
Figure 5 is a perspective view of a casket of the single sealer full couch type provided with the improved sealing means.
Figure 6:
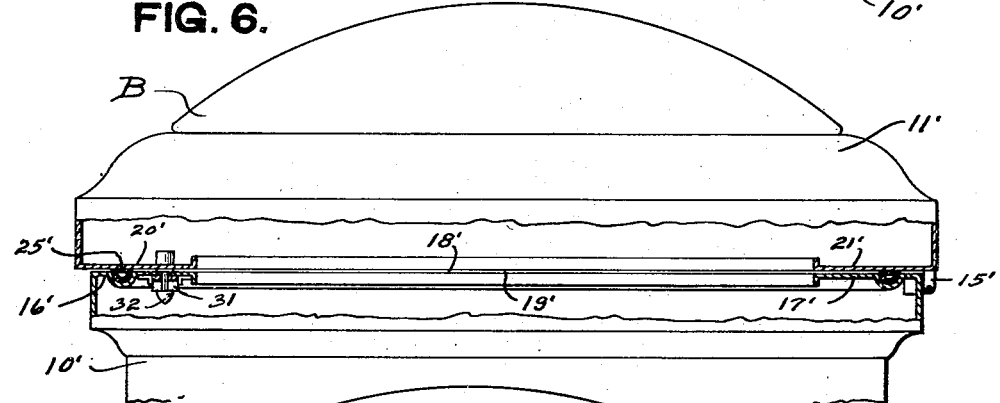
Figure 6 is a fragmentary transverse section thru the casket of Figure 5 with the top in closed, sealed position upon the body portion of the casket.
Figure 7:
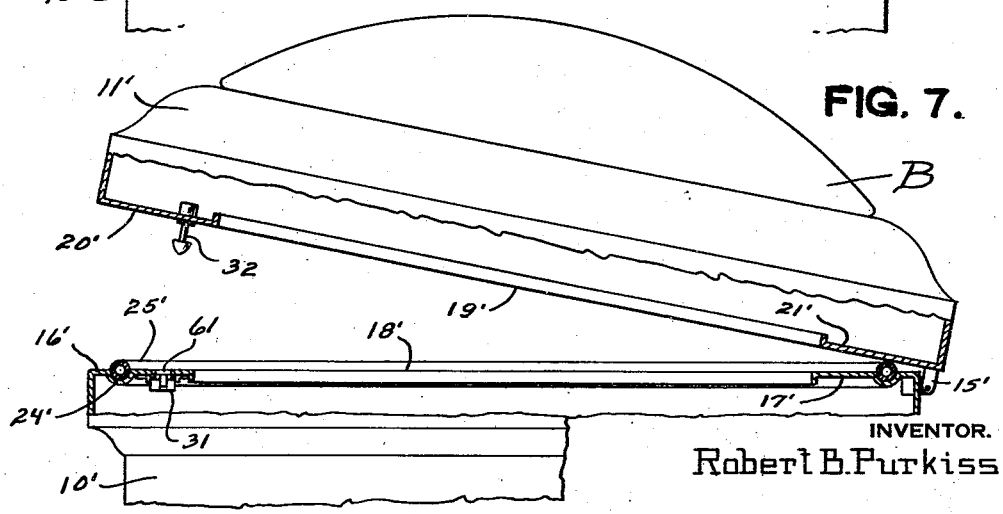
Figure 7 is a view substantially similar to Figure 6 but showing the top partially open.

In the drawings, wherein like reference characters designate corresponding parts thruout the views, Figures 1 to 4 show the sealing means applied to a cut top single sealer casket A, while Figures 5 to 7 show the invention embodied in a full couch single sealer casket B. The letter C may generally designate the sealing means adaptable for use in sealing the caskets A and B, as well as the forms of caskets shown in Figures 14 to 17.

Referring particularly to Figures 1 to 4 inclusive, the casket A comprises a body portion 10 and a top or cover 11 which is transversely divided forming separately movable head and foot sections 12 and 13 respectively. These top sections 12 and 13 are hinged along their rear edge as by hinges 15 to the rear wall of the body portion 10 so as to be independently opened as is usual practice with this type of cut or sectional top casket.

Extended inwardly from the upper edges of the side and end walls of the body portion 10 are flat horizontal flanges providing a front flange 16, a rear flange 17 and end flanges 18. These flanges 16, 17 and 18 form a continuous seat about the upper end of the body portion 10 against which the hinged top sections 12 and 13 are adapted to close. The top sections 12 and 13 are provided at their outer ends with an inwardly extending flange 19 adapted to co-act with the end flanges 18 and along their front and rear edges with inwardly extending flanges 20 and 21 respectively, which are adapted to respectively co-act in confronting relation to the flanges 16 and 17.

The adjacent ends of the top sections 12 and 13 are respectively closed by parallel headers 22 and 23 which are slightly spaced apart to permit independent swinging of the top sections.

Provided in the continuous seat formed by the flanges 16, 17 and 18 is a continuous groove 24 in which is disposed a sealing element in the form of a tubular rubber gasket 25 which normally projects partially above the surface of the flanges so as to be engaged by the flanges of the top 11 when closed upon the body portion 10 and thus form a seal about the entire marginal portion of the top.

The joint between the top sections 12 and 13 is sealed by means of a transverse gasket 26 which co-acts with the marginal gasket 25 to hermetically seal the casket when the lid or top 11 is closed. The header 23 of the top section 13 is provided with a web 27 which extends into a slot 28 of the gasket 26 whereby this gasket is attached to the top section 13 with the ends of the gasket 26 terminating on the center line of the gasket 25, as is shown in Figure 2. The header 22 of the top section 12 is formed with a recessed transverse seat 29 which engages upon the gasket 26 for sealing the space between the headers 22 and 23. This seat 29 acts to compress the gasket 26 against the header 23, while the web 27, aside from forming a retainer for the gasket 26, also forces the end portions of the gasket 26 into sealing relation upon the gasket 25, as will be seen in Figure 3.

Referring now to the sealing or pull-down means C, this means is designed so as to operate for uniformly sealing the casket by means of a wrench or other suitable tool applied to a single operating location on the casket. With particular reference to Figures 8 to 12 of the drawings, the means C is disposed to extend longitudinally beneath the front horizontal flange 16 of the casket body portion 10 and embodies an operating head assembly 30 for actuating a wedge bar 31 which co-acts with pull-down studs 32 on the casket top for drawing the casket top down into sealing relation with the body portion of the casket.

The operating head assembly 30 comprises a mounting portion 33 which is fixedly mounted upon the inner side of one end wall 37 of the casket body portion as by means of bolts 33'. This mounting portion 33 includes a metal housing 34 having a recess 35 in its inner side adapted to enclose the lock nuts 36. Disposed between the outer flat side of the housing 34 and the end wall 37 of the casket body is a rubber head gasket 38, while disposed over the recessed inner side of the housing is a rubber closing gasket 39. As shown in Figure 11, the bolts 33' pass thru the housing 34 and gaskets 38 and 39 so that when tightened, the head gasket 38 seals the housing 34 to the casket wall 37 and also seals about the bolt hole openings. The closing gasket 39 seals against the inner face of the housing 34 and also against the face of the innermost lock nut 36, as well as about the mounting bolts 33'. A bronze washer bearing 40 in the recess 35 forms a thrust bearing for the inner lock nut 36.

Threaded thru the lock nuts 36 is an operating screw 41 having a head 42 at its outer end bearing against the outer end of the housing 34 and which head projects slightly thru an opening 43 in the casket end wall 37. A lock tube or spacer sleeve 44 is disposed between the screw head 42 and the lock nuts 36 and forms a shoulder against which the nuts 36 are locked to prevent loosening of the lock nuts upon rotation of the operating screw in either direction.

The wedge bar 31 is guided for longitudinal movement along the under side of the front casket flange 16 by means of suitable guide clips 45, and is formed with two or more spaced apart cams or wedges 46 having inclined portions 47 which are upwardly inclined in a direction toward the operating head 30. The guide clips 45, as shown in Figure 10 form stops against which the wedges 46 abut to limit opening movement of the wedge bar 31 by the operating screw 41. Each wedge 46 is provided with a key hole slot 48 which extends thruout the inclined portion 47 with the enlarged end portion 49 of the slot formed in the horizontal portion of the wedge bar at the upper end of the wedge. The lower end of each inclined slot 48 terminates in a horizontal portion 50 at the lower end of each wedge 46.

Secured as by welding, brazing or in any other preferred manner to the forward end of the wedge bar 31 is a travel nut 51 having a threaded opening for receiving the operating screw 41 whereby upon rotation of the operating screw, longitudinal movement is imparted to the wedge bar. The head 42 of the operating screw 41 may be provided with a wrench opening or socket 52 for imparting rotation to the screw.

The flange 16 is provided with stud receiving openings 54 which, when the wedge bar 31 is in an open or retracted position will align with the enlarged ends 49 of the key hole slots 48, as shown in Figure 10. A pull-down stud 32 is provided for each wedge 46 of the wedge bar 31.

The pull-down studs 32 are formed with a shank portion having a shoulder 55 intermediate the ends of the shank providing a threaded end portion 56 and a plain neck portion 57 having a tapered or conical head 58 at its lower end. The threaded end portions 56 of the studs are passed thru openings 56' in the front flange 20 of the casket top and receive cap nuts or the like 59 which may be soldered as at 60, if desired, so as to seal the openings 56'.

Each of the top sections 12 and 13 is provided with one or more of the pull-down studs 32; a wedge 46 being provided on the wedge bar 31 for each pull-down stud provided. The neck portions of the studs are of a diameter substantially equal to the width of the narrow portions of the key hole slots 48 whereby the neck portions may be received in the slots after the heads 58 have passed thru the enlarged slot portions 49.

Referring now to Figures 5 to 7 showing the invention embodied in a full couch single sealer casket, like reference characters have been applied to elements of the sealing means C which are similar in construction and operation as that described in connection with the cut top casket A. The casket B comprises a body portion 10' having a one-piece top or cover 11' which is hinged along its rear edge to the body portion by suitable hinges 15'. Extending inwardly from the front and rear walls of the body portion 10' are flat horizontal front and rear flanges 16' and 17' respectively, while extending inwardly from each end wall of the body portion in alignment with the front and rear flanges are flat horizontal end flanges 18' which co-act with the flanges 16' and 17' to form a continuous seat about the upper end of the body portion 10'. Extending inwardly from the longitudinal edges of the top 11' are front and rear flanges 20' and 21' respectively, which align with inwardly extending end flanges 19' at the ends of the top. When the top 11' is closed, the marginal flanges thereon are in parallel confronting relation to the marginal flanges about the top of the body portion 10'.

The continuous seat formed by the flanges 16', 17' and 18' is provided with a continuous groove or channel 24' in which is partially embedded a tubular rubber gasket 25' or any other suitable gasketing means, to be engaged by the flat flanges of the top 11' when the latter is closed upon the body portion of the casket.

Since the sealing means C employed in the form of casket B is identical in construction and operation as that used in the form of casket A, a further description of the application of the sealing means to the casket B is believed unnecessary. In all forms of the invention, the sealing operation is accomplished thru means of a single longitudinally movable wedge bar concealed within the body portion of the casket and co-acting with pull-down studs on the closure portion of the casket.

The front flange 20' of the top 11' is provided with two or more of the pull-down studs 32 which pass thru openings 61 in the front flange 16' of the body portion 11' into operative relation to the wedge bar 31.

In both forms of casket A and B it will be seen that the wedge bar 31 is disposed inwardly of the sealing gasket 25 or 25'.

In operation to hermetically seal the casket A, the operating head 30 is in the position shown in Figure 10 whereby the wedge bar 31 is in a retracted position with the enlarged ends 49 of the keyhole slots 48 aligning beneath the openings 54 in the front flange 16. The hinged top 11 is then lowered until it rests upon the continuous gasket 25 and the headed ends of the pull-down studs project down thru the aligned openings 54 and 49. The operating screw 41 is then turned and the travel nut 51 drawn toward the mounting portion 33 for imparting a longitudinal or pull-down closing movement to the wedge bar 31. As the wedge bar is moved, the heads 58 of the pull-down studs 32 will ride down the inclined portions 47 of the wedges 46 and pull the top 11 into compressing relation upon the gasket 25, thus effecting a seal about the entire upper margin of the body portion 10. As the operating head 30 is actuated, the pull-down studs are moved in a direction at a right angle to the direction of travel of the wedge bar 31, so that the top section 12 is first drawn down compressing the transverse gasket 26 and then both top sections 12 and 13 drawn down upon the body gasket 25. When the travel nut 51 is drawn by the operating screw 41 against the closing gasket 39, as shown in Figure 11, the gasket 39 is compressed against the inner end of the housing 34 and also against the face of one of the lock nuts 36, thus effectively sealing the operating head. If so desired, a plastic compound may be placed on the screw threads of the operating screw 41 for further sealing any opening thru the lock nuts. Thus, from a single operating point, the casket top will be evenly sealed upon the body portion of the casket.

The manner of sealing the casket B is believed will be readily apparent from the foregoing.

With particular reference now to the forms of the invention shown in Figures 14 to 17, the sealing arrangement as shown therein is adapted for use in connection with sealer caskets of the separate or inner seal type wherein a separate inner seal is used in conjunction with a separate top or cover.

Figure 14:
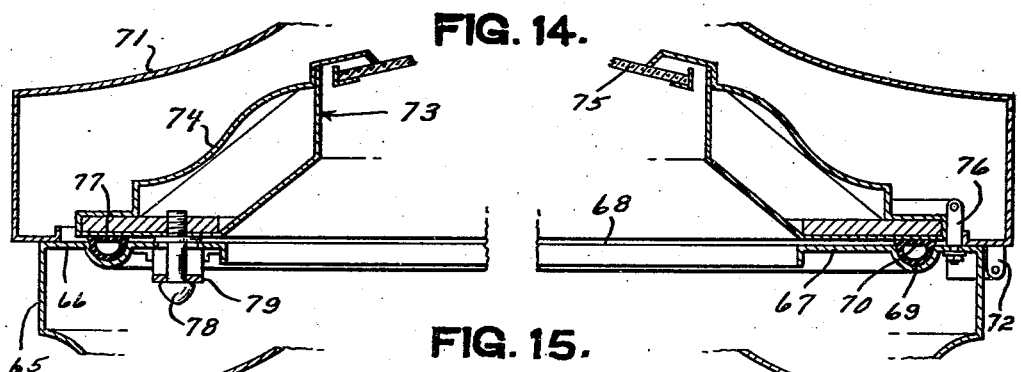
Figure 14 is a detail transverse section showing a modification of the invention applied to a single sealer casket of the separate or inner seal type.

Referring first to Figure 14, the casket body portion 65 has inturned front, rear and end flanges 66, 67 and 68 respectively providing a continuous seat which is formed with a continuous groove or channel 69 receiving a continuous gasket 70. The top or cover 71 is hinged along its rear edge to the rear wall of the body portion 65 by suitable hinges 72. A separate or inner seal 73 is enclosed by the top 71 and includes an open frame 74 provided with a glass or other suitable panel 75. The frame 74 is hinged along its rear edge as at 76 to the rear body flange 67, and is provided with a continuous marginal flange 77 adapted to seat upon the gasket 70. Pull-down studs 78 are carried by the flange along the forward edge of the frame 74 and extend thru openings in the front body flange 66 for engagement by the wedge bar 79 whereby the inner seal 73 may be drawn down upon the gasket 70 to seal the casket. Thus, it will be noted that this form of the invention differs slightly from that shown in Figures 1 and 5 in that while the sealing gasket is in the casket body, the pull-down studs are attached to the inner seal 73 within the area of the gasket 70.

Figure 15:
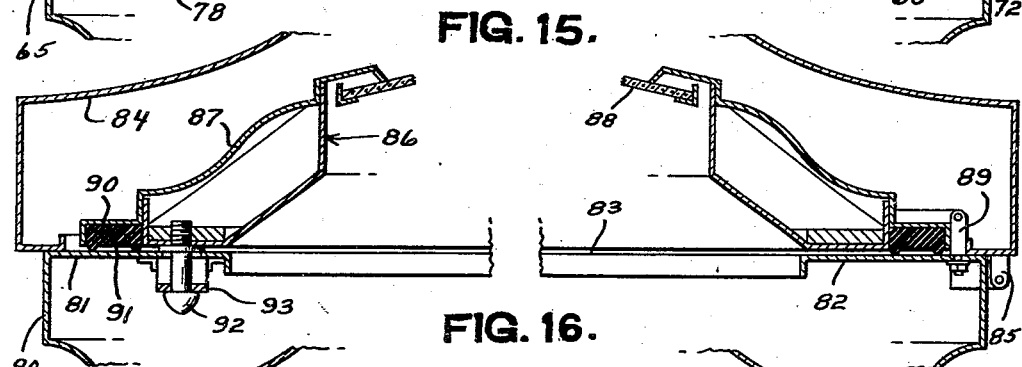
Figure 15 shows a further modification of the inner seal type having a modified form of gasket carried by the inner seal.

In Figure 15, the casket body 80 has inturned flat front, rear and end flanges 81, 82 and 83 respectively, forming a continuous seat about the upper side of the body portion. The top or cover 84 is hinged at 85 to the rear wall of the casket body portion. The separate or inner seal 86 includes an open frame 87 having a panel 88 of glass or other suitable material. The frame 87 is hinged along its rear edge as at 89 to the rear body flange 82. A downwardly opening marginal channel 90 is formed about the frame 87 and carries a continuous gasket 91 which is adapted to seal upon the flat flanges 81, 82 and 83 of the casket body portion. Pull-down studs 92 are carried by the forward portion of the frame 87 inward of the gasket 91 and co-act with a wedge bar 93 for drawing the inner seal 86 downward and compressing the gasket 91. In this form of the invention, the gasket is carried by the separate sealer frame.

Figure 16:
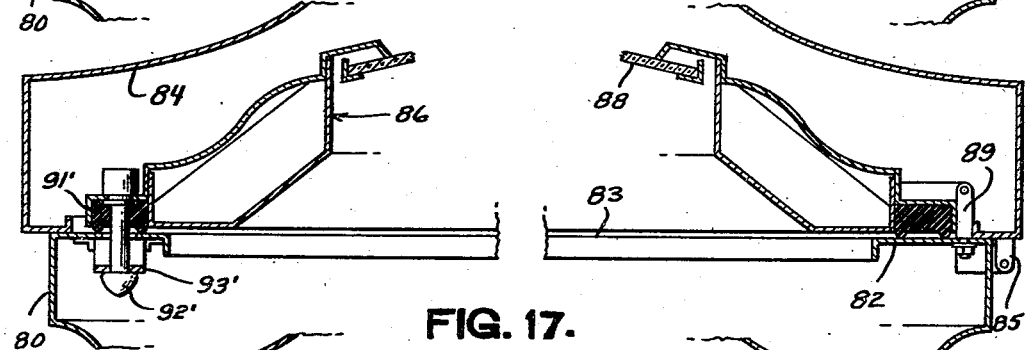
Figure 16 shows a modification wherein the pull-down studs pass thru the gasket.

The form of the invention shown in Figure 16 is substantially similar to that shown in Figure 15 and like reference characters have been applied to corresponding parts. In this form of the invention, however, the pull-down studs 92' are extended thru the center line of the sealing gasket 91' and the wedge bar 93' is disposed directly beneath the gasket.

Figure 17:
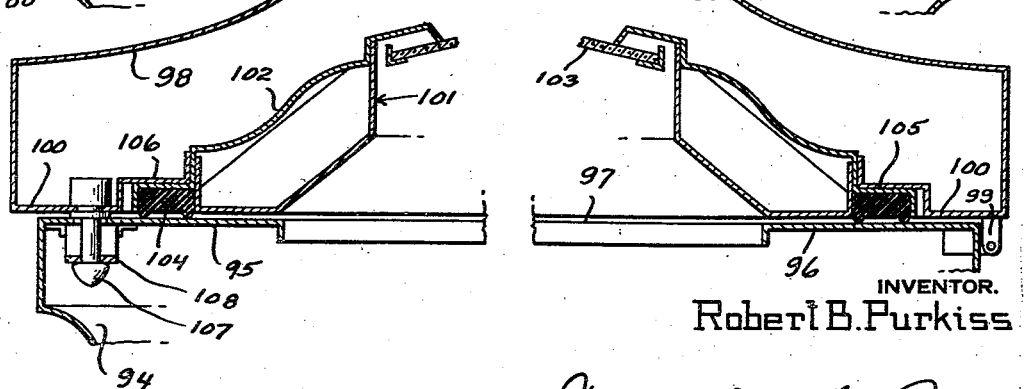
Figure 17 shows a further modification of the separate or inner sealer wherein the casket top acts upon the margin of the inner seal for compressing the sealing gasket.

With reference to Figure 17, the casket body portion 94 has flat inturned front, rear and end flanges 95, 96 and 97 respectively, forming a continuous seat. A top 98 is hinged along its rear edge as at 99 to the rear wall of the casket body 94 and has an inturned marginal flange 100. The separate or inner seal 101 comprises an open frame 102 provided with a transparent or other panel 103. A downwardly opening marginal channel is formed about the frame 102 for receiving a continuous gasket 104, and this channel forms a marginal shoulder or seat 105. As will be seen, the inner seal 101 is not hinged to the casket body. The inturned marginal flange 100 is formed with a shoulder flange 106 which is adapted to engage upon the seat 105 of the frame 102. Pull-down studs 107 are carried by the flange 100 along the forward edge of the top 98 and are adapted to co-act with a wedge bar 108 mounted beneath the body flange 95. Thus, when pressure is applied to the top 98 by the pull-down lugs 107, the shoulder flanges 106 engage upon the seat 105 and exert a pressure on the frame 102 for compressing the gasket 104.

Referring to the modified form of pull-down stud mounting shown in Figure 13, the threaded portion 56' receives a dished washer 110 beneath which is disposed a plastic material such as putty or the like 111 for forming a seal about the shank of the stud. A nut 112 is threaded into engagement with the washer 110 for retaining the stud in place.

While the caskets have been shown of metal, the caskets may be of any suitable material customary in the art.

Thus it will be seen that in all forms of the invention, an even sealing action is had thruout the entire sealing area thru means of a concealed wedge bar operable from a single location and co-acting with a series of pull-down studs.

Changes in detail may be made to the forms of the invention herein shown and described, without departing from the spirit of the invention or the scope of the following claims.

I claim:

1. A sealing means for a casket of the type employed independently movable top sections, said sections having their inner ends disposed in substantial abutment; comprising, a sealing gasket disposed entirely around the margin of the body of the casket and adapted to be abutted by the margin of the top sections when the top sections are closed, a transverse gasket connected to the inner end of one of said top sections, said transverse gasket having its ends terminating within the width of said marginal sealing gasket and therefore overlying said marginal sealing gasket transversely, said transverse gasket adapted, upon closing of the top sections upon the body of the casket and in combination with the marginal gasket, to afford a complete seal between the top sections.

2. In a burial casket of the type including a body, independently movable top sections mounted on the body and having their inner ends disposed immediately adjacent when closed; a marginal sealing gasket extending entirely around the margin of the body, a transverse sealing gasket adapted to seal the joint between the top sections, said transverse gasket mounted adjacent the inner end wall of one of said top sections and its respective ends having sealing contact with the marginal gasket at the front and back of the casket when the top sections are drawn down upon the body.

3. In a casket construction, a body, a sealing means, comprising a marginal sealing gasket extending entirely around the margin of the body of the casket, a top section, said top section and body including cooperating means for pulling said top section down upon the body, said cooperating means disposed entirely within the zone of the body sealed by the marginal gasket and including operating means extending parallel with and adjacent to the forward run of the marginal gasket, said operating means extending beyond the zone of the body sealed by the marginal gasket, and means for sealing said operating means at the point where it extends beyond the zone of the body sealed by the marginal gasket whereby the entire casket is effectively sealed.

4. In a casket construction, a body, a sealing means, comprising a marginal sealing gasket extending entirely around the margin of the body of the casket, a top section, said top section and body including cooperating means for pulling said top section down upon the body, said cooperating means disposed entirely within the zone of the body sealed by the marginal gasket and including operating means extending parallel with and in back of the forward run of the marginal gasket, said operating means extending through the wall of the casket body, means for sealing said operating means at the point where it extends through the wall of the casket body, and means projected externally of the casket body for operating said operating means to pull the top down upon the sealing gasket.

ROBERT B. PURKISS.